Figure 1:
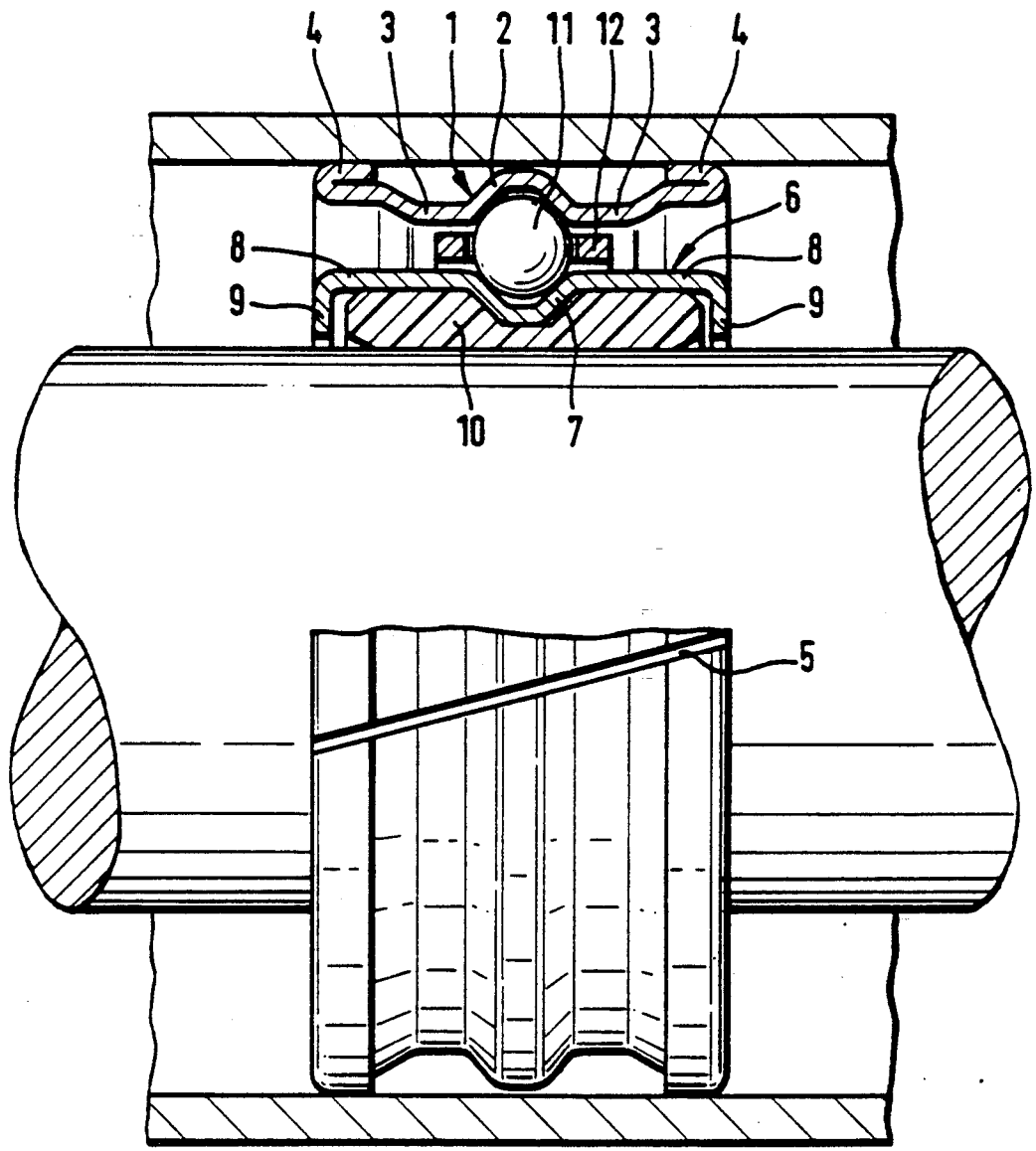

United States Patent [19]

Pflungner

[11] Patent Number: 5,102,241
[45] Date of Patent: Apr. 7, 1992

[54] RADIAL BALL BEARING

[75] Inventor: Wolfgang Pflungner, Herzogenaurach, Fed. Rep. of Germany

[73] Assignee: INA Walzlager Schaeffler KG, Fed. Rep. of Germany

[21] Appl. No.: 644,095

[22] Filed: Jan. 22, 1991

[30] Foreign Application Priority Data

Feb. 2, 1990 [DE] Fed. Rep. of Germany ....... 4003052

[51] Int. Cl.$^5$ ............................................. F16C 33/60
[52] U.S. Cl. ................... 384/499; 384/502; 384/513; 384/538
[58] Field of Search .............. 384/492, 499, 501, 502, 384/505, 506, 513-516, 536, 538; 29/898.066, 898.06, 898.063

[56] References Cited

U.S. PATENT DOCUMENTS

| | | | |
|---|---|---|---|
| 2,193,549 | 3/1940 | Chamberlin | 384/536 |
| 3,262,185 | 7/1966 | Hornigold | 29/898.006 |
| 3,559,263 | 2/1971 | Cavagnero et al. | 29/898.066 |
| 3,604,545 | 9/1971 | Bourgeois | 384/536 X |
| 3,628,838 | 12/1971 | Camosso | 384/514 X |
| 3,657,781 | 4/1972 | Camosso | 29/898.066 |
| 3,807,820 | 4/1974 | Schuhmann | 384/538 |
| 3,975,067 | 8/1976 | Martin | 384/570 |
| 4,073,551 | 2/1978 | Sutowski | 384/501 |

FOREIGN PATENT DOCUMENTS 1273661 11/1986 U.S.S.R. ................ 384/492

Primary Examiner—Thomas R. Hannon
Attorney, Agent, or Firm—Bierman and Muserlian

[57] ABSTRACT

A radial ball bearing comprising two race rings bent round from sheet strip, in which rings, ball raceways are formed and balls preferably arranged spaced apart in a cage roll, characterized in that in continuation of the ball raceways in both axial directions, the race rings are provided with integrally formed cylindrical prolongations, stiffening rims are formed at least on the outer race ring and the outer race ring has a smaller outer diameter in the region of the ball raceway than in the region of the stiffening rims.

7 Claims, 3 Drawing Sheets

RADIAL BALL BEARING

STATE OF THE ART

Radial ball bearings comprising two race rings bent round from sheet strip, in which rings, ball raceways are formed and balls preferably arranged spaced apart in a cage roll are known. In ball bearings of this type, during the operation of bending round the race rings from sheet strip, the race rings are simultaneously given an approximately semi-circular groove-shaped cross-sectional profile in which the balls roll. The race rings bent round from sheet material in turn bear against semi-circular grooves of the adjacent structural component as shown in DE-OS 1,602,446.

OBJECTS OF THE INVENTION

It is an object of the invention to provide a ball bearing comprising such race rings bent round from a sheet strip which, while being most simple to manufacture, can bridge larger tolerances of the adjacent structural components while maintaining freedom from play in the bearing.

This and other objects and advantages of the invention will become obvious from the following detailed description.

THE INVENTION

The novel radial ball bearing of the invention comprises two race rings bent round from sheet strip, in which rings, ball raceways are formed and balls preferably arranged spaced apart in a cage roll, characterized in that in continuation of the ball raceways in both axial directions, the race rings are provided with integrally formed cylindrical prolongations, stiffening rims are formed at least on the outer race ring and the outer race ring has a smaller outer diameter in the region of the ball raceway than in the region of the stiffening rims.

Such a race ring is simple to manufacture and by reason of the stiffening rims has sufficient stability which, however, due to the intermediate cylindrical prolongations, has no effect on the ball raceways. Besides this, due to the fact that the ball raceway has a smaller outer diameter than the stiffening rims, it can yield radially within certain limits thus bridging tolerances existing in the bore of the structural component which receives the outer ring.

In an appropriate development of the invention, the inner race ring can contain a sleeve of polymeric material in its bore for bridging tolerances, this sleeve being retained between radial rims formed at the end regions of the prolongations. In this way, it is also possible to tolerate even larger tolerances of the outer diameter of a shaft carrying the inner race ring without the tolerances having a detrimental effect on the bearing. By the radial rims at the end regions of the inner race ring, the sleeve made of polymeric material is at the same time connected to the inner race ring to form a transportable structural unit.

It is advantageous to make the joints at which the ends of the sheet strips abut against each other inclined to the bearing axis because this has a favorable effect on the rolling of the balls in the ball raceways.

If it is considered to be useful, at least one of the race rings can be welded together at the joint, in which case, it is better to locate the welded joint solely in the region of the cylindrical prolongations or in the region of the stiffening rims to avoid changes in microstructure that occur in the region of the raceway during welding which could have an adverse effect on the life of the rolling bearing.

When the sheet strip is cut to the required length, the cutting tool causes an indentation of the material in the shape of a slight curve on one side of the sheet strip at the cut edge. It is advisable when bending the sheet strip, to place it so that this material indentation faces away from the ball raceway in the bent state, this being conducive to a smooth rolling of the balls.

REFERRING NOW TO THE DRAWINGS

Figure 2:
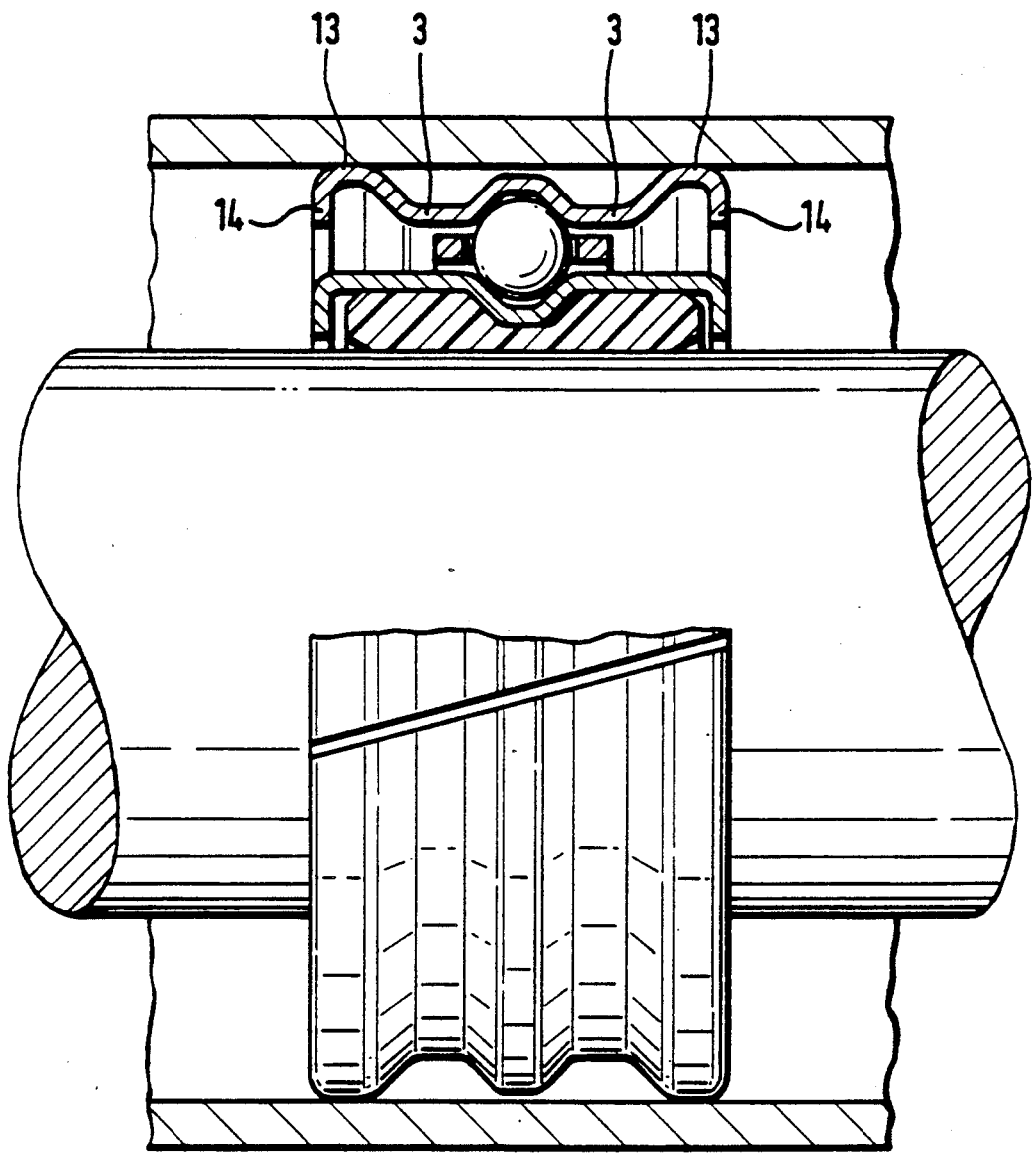
Figure 3:
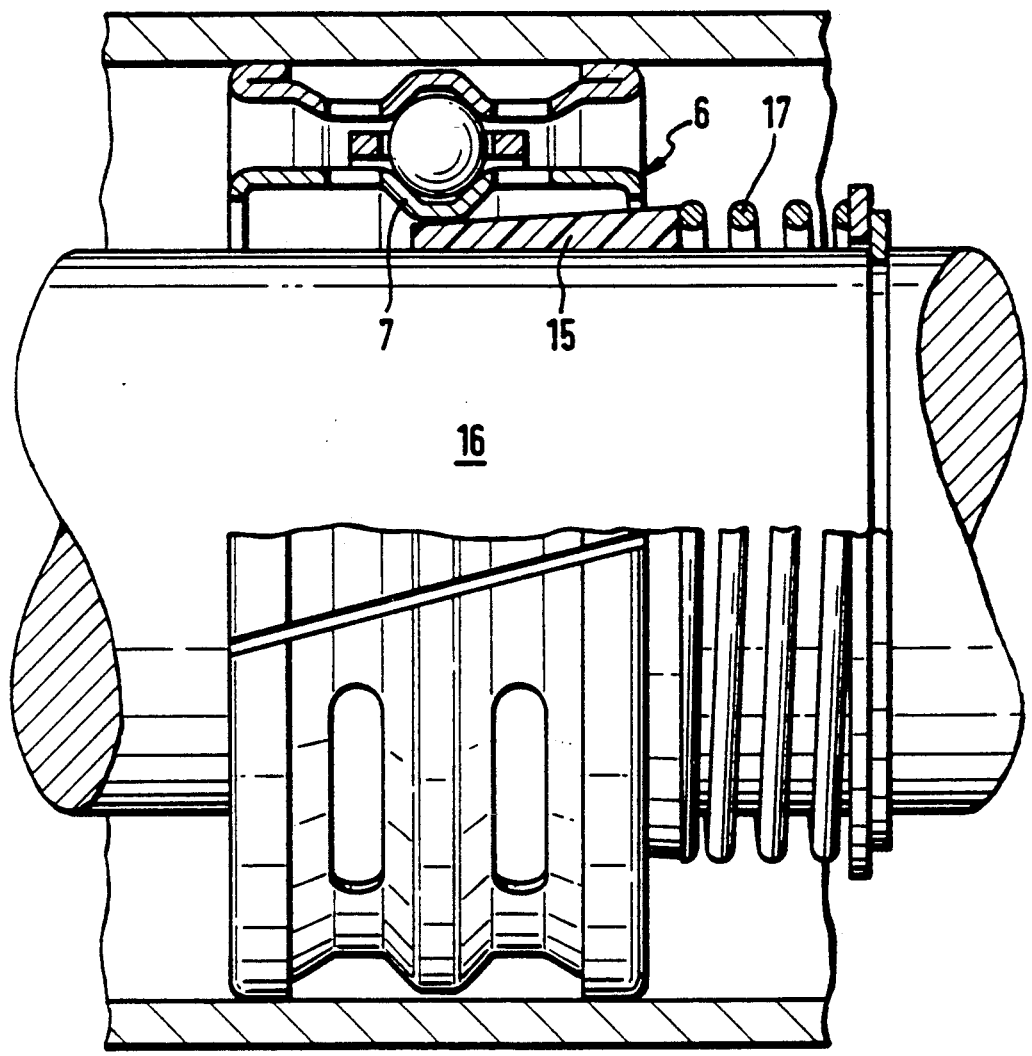

FIGS. 1 to 3 are partial longitudinal cross sections of three different embodiments of the invention.

FIG. 1 shows the outer race ring 1 bent from a sheet strip and comprising a ball raceway 2 in its central region. In both axial directions, this ball raceway merges into integrally formed cylindrical prolongations 3 which, in their end regions are folded outwards to form stiffening rims 4. In the region of these stiffening rims 4 which at the same time form the seating faces for the race ring 1, the outer race ring 1 has a larger diameter than in the region of the ball raceway 2. The sheet strip from which the outer race ring 1 is made is cut obliquely at both its ends so that after bending round, a joint 5 inclined to the longitudinal axis of the bearing is obtained.

The inner race ring 6 which is likewise bent round from a sheet strip also comprises a ball raceway 7 which in both axial directions merges into cylindrical prolongations 8 which terminate in radially inward oriented rims 9. In the bore of the inner race ring 6, a ring 10 made of polymeric material is arranged which is provided with longitudinal ribs in its bore in a manner known in itself. Balls 11 which are retained spaced apart in a schematically represented cage 12 roll in the two ball raceways 2 and 7.

The embodiment of FIG. 2 differs from that of FIG. 1 only in that, in continuation of the cylindrical prolongations 3, the outer ring is shaped radially outwards to form the seating faces 13 and these seating faces 13 merge into radially inward oriented stiffening rims 14.

The embodiment of FIG. 3 differs from that of FIG. 1 only in that, instead of the sleeve 10 made of polymeric material, a tapered sleeve 15 is provided within the inner ring and bears against the shaft 16 on one side and against the ball raceway 7 of the inner ring 6 on the other side. This tapered sleeve 15 is acted upon frontally by a helical spring 17 which at its other end bears against a shoulder of the shaft 16 and assures that the inner race ring 6 always bears against the shaft 16 without play.

The invention permits the joining together of the ends of one or both race rings at the joint 5 by welding. In this case, welding is done solely in the region of the cylindrical prolongations 3 or in the region of the stiffening rims 4 or 14 to avoid detrimental influences of temperature in the region of the ball raceways 2 and 7.

Various modifications of the bearing of the invention may be made without departing from the spirit or scope thereof and it is to be understood that the invention is intended to be limited only as defined in the appended claims.

What is claimed is:

1. A radial ball bearing comprising two race rings bent round from sheet strip to form a joint at which the ends of the sheet strips abut against each other, in which rings, ball raceways are formed and balls preferable arranged spaced apart in a cage roll, characterized in that in continuation of the ball raceways in both axial directions, the race rings are provided with integrally formed cylindrical prolongations, stiffening rims are formed at least on the outer race ring and the outer race ring has a smaller outer diameter in the region of the ball raceway than in the region of the stiffening rims, at least one of the race rings is welded together at the joint.

2. A ball bearing of claim 1 wherein the inner race ring contains a sleeve made of polymeric material in its bore for bridging tolerances, which sleeve is retained between radial rims formed at the end regions of the prolongations.

3. A ball bearing of claim 1 wherein the joints at which the ends of the sheet strips abut against each other are inclined with respect to the longitudinal axis of the bearing.

4. A ball bearing of claim 2 wherein the joints are inclined with respect to the longitudinal axis of the bearing.

5. A ball bearing of claim 4 wherein the welded joint is located solely in the region of the cylindrical prolongations or in the region of the stiffening rims.

6. A ball bearing of claim 2 wherein at least one of the race rings is welded together at the joint.

7. A ball bearing of claim 1 wherein a material indentation occurring at the cut edge when the sheet strip is cut, faces away from the ball raceway in the bent round race ring.

* * * * *

UNITED STATES PATENT AND TRADEMARK OFFICE
CERTIFICATE OF CORRECTION

PATENT NO. : 5,102,241
DATED : April 7, 1992
INVENTOR(S) : WOLFGANG PFLUGNER

It is certified that error appears in the above-identified patent and that said Letters Patent is hereby corrected as shown below:

Title page, item

[75]   "Wolfgang Pflungner"   should be
       --Wolfgang Pflügner--

Title page, item [19], should read --Pflugner--

Signed and Sealed this

Thirteenth Day of July, 1993

Attest:

MICHAEL K. KIRK

Attesting Officer    Acting Commissioner of Patents and Trademarks